INVENTORS.
William B. Clarke
Anthony J. Baldassare
Joseph Yut
THEIR ATTORNEYS

INVENTORS.
William B. Clarke
Anthony J. Baldassare
Joseph Yut
BY
THEIR ATTORNEYS INVENTORS.
William B. Clarke
Anthony J. Baldassare
Joseph Yut
THEIR ATTORNEYS Oct. 15, 1957 W. B. CLARKE ET AL 2,809,769
TRANSFER APPARATUS
Filed Dec. 20, 1954 5 Sheets-Sheet 5

INVENTORS.
William B. Clarke
Anthony J. Baldassare
Joseph Yut
BY
THEIR ATTORNEYS `United States Patent Office`

2,809,769
Patented Oct. 15, 1957

2,809,769
TRANSFER APPARATUS

William B. Clarke, Sewickley, Anthony J. Baldassare, Coraopolis, and Joseph Yut, Pittsburgh, Pa., assignors to Rockwell Spring and Axle Company, Coraopolis, Pa., a corporation of Pennsylvania Application December 20, 1954, Serial No. 476,106

8 Claims. (Cl. 221—116)

This invention relates to transfer apparatus and, more particularly, to apparatus designed for automatically transferring to a delivery station the topmost article from alternate stacks of the article.

In processing articles such as metal sheets or similar stock, it often is necessary to handle only a few at a time, especially when a subsequent operation is to be performed on each sheet individually. As an instance, substantially rectangular metal sheets, such as are used for stamping or other metal forming steps, are normally carried to a point of use in stacks. Accordingly, it is then necessary to transfer the sheets one at a time from the stack to other apparatus which may be, for example, a conveyor to carry the sheet through straightening mechanism or to the desired metal forming apparatus.

Machines have been suggested previously for transferring a plurality of sheets one at a time from a stack to another point. To our knowledge, such machines are usually limited to a single stack which, because of the size of the machine, is in turn limited to a certain height. In other machines which have been adapted to carry two or more stacks, one of the stacks must be exhausted or at least partially exhausted before the sheets of a second stack are processed. In such cases, particularly when the stacks are placed closely together, the unused stack can interfere with the removal of the sheets from the other stack, especially when nearing the bottom of the stack being processed.

The first type of machine mentioned has a batch operation limited to a single stack. This requires frequent shutdown periods in which another stack is readied. The second type of machine mentioned has a longer period of batch operation but requires the attention of a stand-by operator to switch from one stack to another at the proper moment and to guard against any interference between the stacks during removal of the sheets from the first stack.

Our apparatus has the increased capacity of a transfer machine adapted to receive more than one stack and also entirely eliminates the need for a stand-by operator to switch from the first stack to a second stack after the first has been exhausted. Our apparatus further eliminates any interference between stacks no matter how closely together the stacks are placed. We accomplish this by adapting our apparatus to receive a double supply of stacks and automatically remove, in alternate fashion, the topmost sheet of each stack. In this manner, the machine can operate twice as long as with a single stack without an intervening shutdown period. Further, a stand-by operator is not needed to switch the transfer apparatus from one stack to a second stack. In addition, since both stacks decrease in size together, there is no interference from one stack to the removal of sheets from the other.

In one form, our apparatus includes a carriage mounted for reciprocation between a delivery station and the stacks. A lever pivoted on the carriage has vacuum cups to grip the topmost sheet of each stack. Cam means operated by the movement of the carriage cause the latter upon returning from the delivery station to stop alternately adjacent each stack, so that the lever removes the topmost sheet from alternate stacks and carries it to the delivery station. In the preferred form, a number of the vacuum cups depend from the lever. Each cup has a vent normally closed by a plug. A cam adjacent the delivery station lifts the plug to open the vent and thereby releases the sheet from the vacuum cups.

The accompanying drawings illustrate a presently preferred embodiment wherein.

Figure 1:
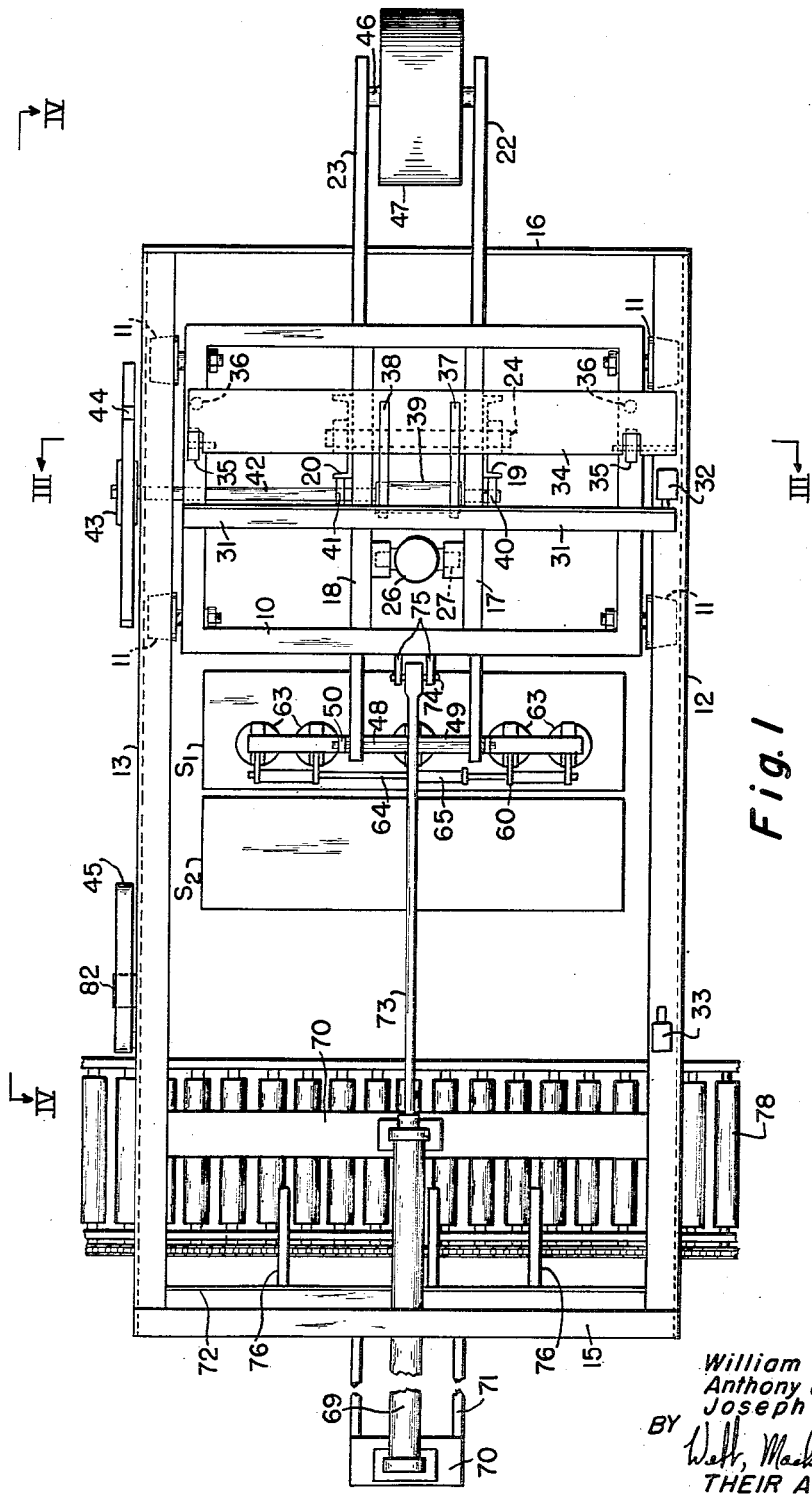
Figures 1 and 2 are plan and side views, respectively, of transfer apparatus embodying our invention.

Referring to the drawings, our apparatus includes a substantially rectangular carriage 10 mounted on rollers 11 for reciprocation in side channel beams 12 and 13. Posts 14 reinforced by cross bars 15 and 16 carry these beams. Additional channel beams 17 and 18 extend across the carriage and are fixed, respectively, to vertically disposed beams 19 and 20. A lever generally shown at 21 consists of two arms 22 and 23 which are fixed to a shaft 24 journaled in the beams 19 and 20. Arm 22 is engageable with a limit switch 25 on beam 19. A double-acting air cylinder 26 is trunnion mounted on a shaft 27 carried by the beams 17 and 18 and has a piston rod 28 terminating in a clevis 29. The clevis freely pivots about a shaft 30 joining the arms 22 and 23 intermediate their forward ends and the shaft 24.

Figure 2:
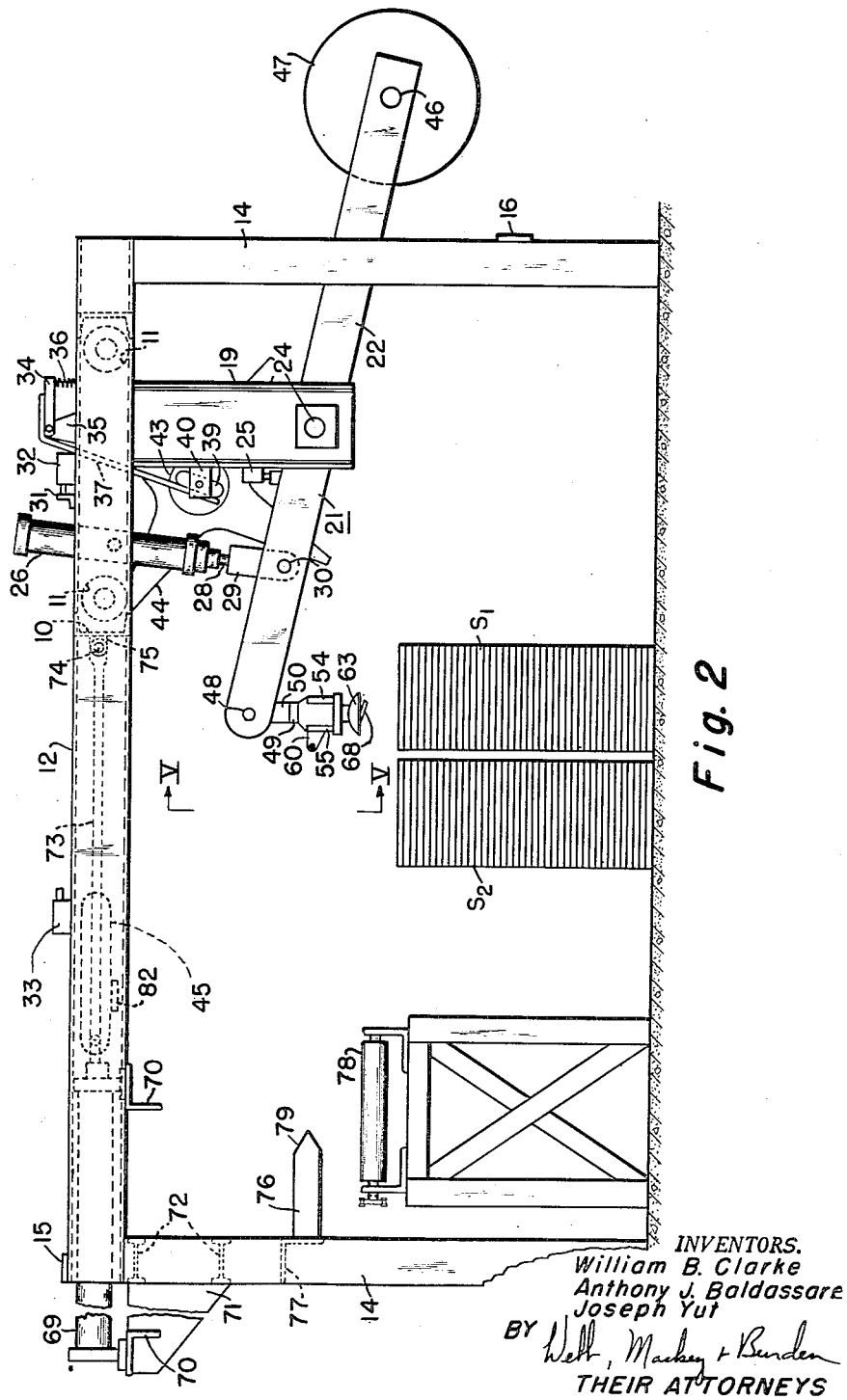
Figure 3:
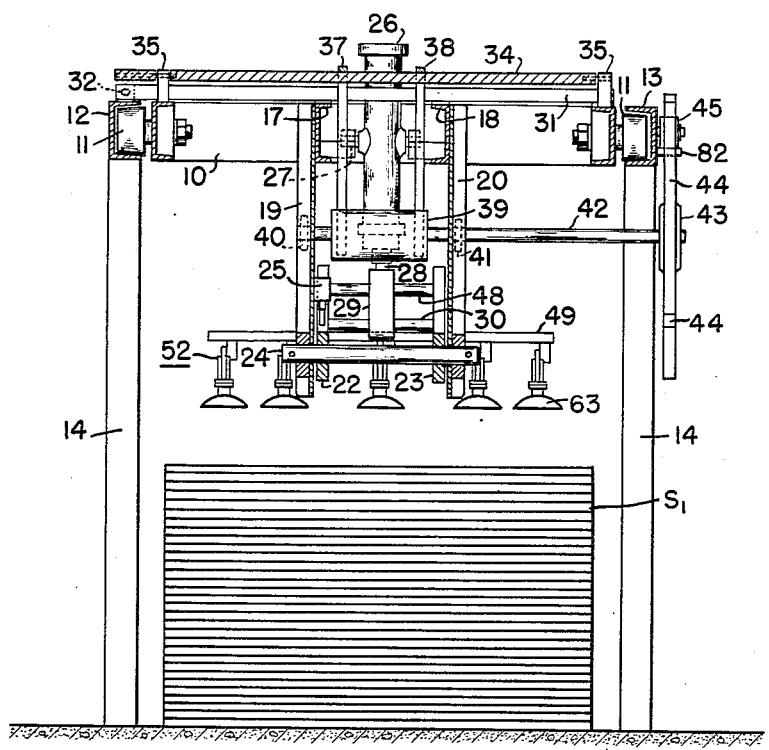
Figure 3 is a section of Figure 1 on the line III—III.
Figure 4:
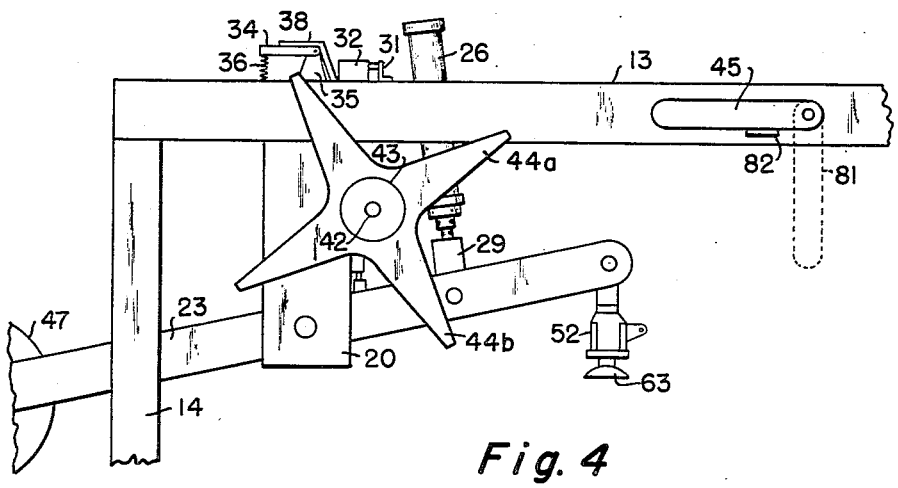
Figure 4 is a section of Figure 1 on the plane of the line IV—IV and shows cam means to stop the carriage alternately adjacent each stack.
Figure 5:
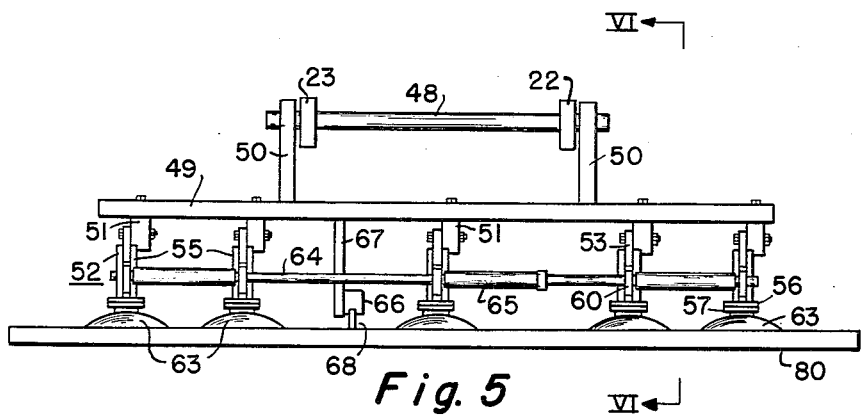
Figure 5 is a section of Figure 2 on the plane of the line V—V and shows the vacuum cups removing a sheet from one of the stacks.
Figure 6:
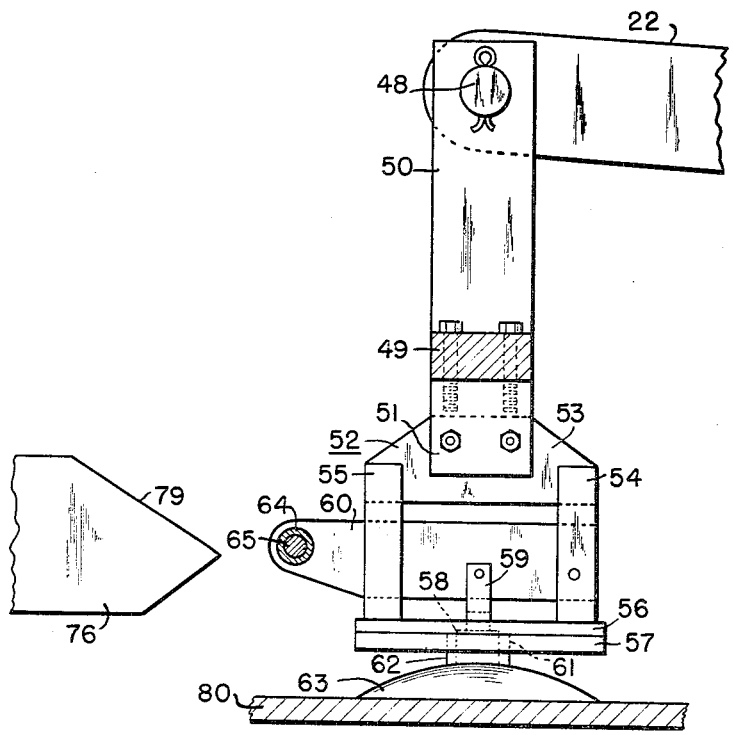
Figure 6 is a section of Figure 5 on the line VI—VI.

An angle beam 31 extends across the carriage 10 and over the channel beam 12 to engage limit switches 32 and 33. A strip 34 pivotally mounted along its forward edge in brackets 35 carried on the sides of the carriage 10 similarly extends over channel beam 12 and can, if desired, engage limit switch 32 as hereinafter described. A fixed spring 36 bears at opposite ends against the strip 34 and a side of the carriage 10 and thereby urges a pair of bent arms 37 and 38 fixed to the strip 34 against a cam roller 39. This roller has substantially a rectangular cross-section with rounded ends. Lugs 40 and 41 extending from the beams 19 and 20, respectively, journal a shaft 42 to which the roller 39 is fixed. Shaft 42 extends to one side (Figure 3) and terminates in a fixed cam wheel 43 provided with four radial arms 44. As hereinafter described, cam wheel 43 has four positions of rest, one of which is shown in Figure 4, each position resulting from rotating shaft 42 ninety degrees. The arms 44 of the cam wheel are so radially disposed about shaft 42 that following the ninety degree rotations of that shaft, the shorter radius and the longer radius of roller 39 alternately engage the arms 37 and 38. Accordingly, the strip 34 is either pivoted upwardly when the shorter radius of roller 39 engages the arms, as shown in Figure 2, to clear the limit switch 32, or the strip is lowered when the longer radius of the roller engages the arms so that the strip can engage that limit switch. An arm 45 (Figure 4) pivoted on beam 13 actuates the cam wheel 43.

At the rearward end of lever 21, a rod 46 joins the ends of arms 22 and 23 and carries a counterweight 47. At the forward end of lever 21, a shaft 48 free to pivot in the arms 22 and 23 carries a beam 49 by depending connecting bars 50. The beam 49 supports a plurality of vacuum engaging means. Each of such means includes a block 51 bolted to the beam 49. A frame generally shown at 52 is bolted to each of the blocks 51 and comprises an upper plate 53 connected by side strips 54 and 55 to lower plates 56 and 57. The latter make an airtight face to face seal. Plate 56 has an opening 58 in which a plug 59 makes an airtight fit. A lever 60 pivoted to the side strips 54 extends between those strips and strips 55 and pivotally holds the plug 59. Plate 57 also has an opening 61 which communicates with opening 58 and receives a collar 62 of a rubber vacuum cup 63. A rod 64 joins the levers 60 of each frame and has wear sleeves 65 spaced thereon. The beam 49 also carries a limit switch 66 at the end of a depending bar 67. The leg 68 of the switch extends somewhat below the vacuum cups 63.

A double-acting air cylinder 69 is supported by angle beams 70 and a ledge 71 fixed to beams 72 extending between the forward posts 14. The cylinder has its piston rod 73 pivoted by a pin 74 to lugs 75 extending from the carriage 10. Cams 76 also suitably supported by an angle beam 77 between the forward posts 14 partially overlie a conventional roller table 78 representing a delivery station.

Assuming a cycle of operation to begin when the carriage 10 is at its most retracted position and when the cam roller 39 bears against the arms 37 and 38 with its shorter radius so that the strip 34 is pivoted upwardly to an inoperative position, a stage of the cycle represented by Figure 2, the operation of our apparatus is as follows.

Figure 7:
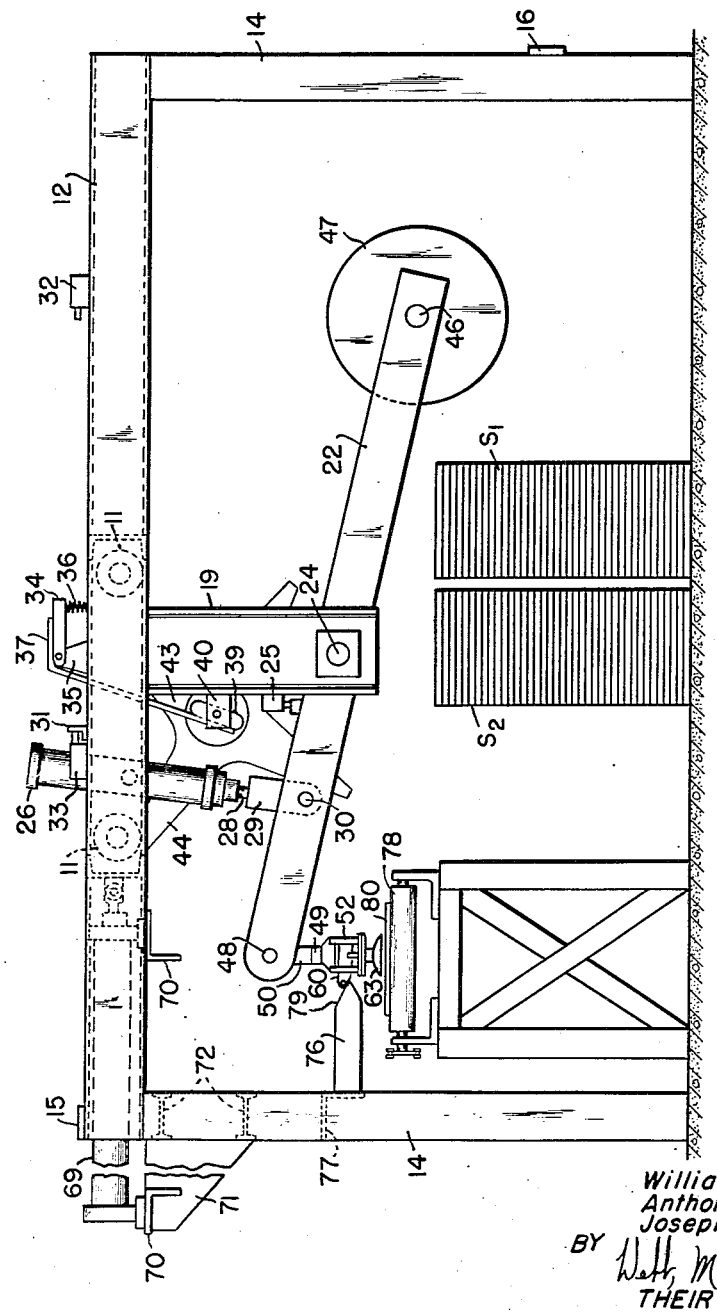
Figure 7 is a side view similar to that of Figure 2 but illustrates the carriage in a more forward position.

The double-acting cylinder 26 is conventionally operated to pivot lever 21 in a counterclockwise direction (Figure 2) and press the vacuum cups 63 against the topmost sheet of stack $S_1$. The cups grip the sheet by partially flattening out and forming a partial vacuum within in a well-known manner. At the same time, leg 68 of limit switch 66 is tripped by contacting the stack. This reverses the action of cylinder 26 and pivots the lever in a clockwise direction. Upon rising, arm 22 trips limit switch 25 to stop the action of cylinder 26 and begin that of cylinder 69. As the latter pulls the carriage 10 toward the roller table 78, the sleeves 65 on the rod 64 strike the cams 76 as shown in Figure 7. In rising over the inclined surface 79, rod 64 pivots the levers 60 to lift the plugs 59 and release the partial vacuum within the cups 63. A sheet 80 transferred by the cups thereupon drops onto the roller table 78 which carries the sheet to a desired point of use. Shortly thereafter, beam 31 strikes limit switch 33 which reverses cylinder 69 to move the carriage back.

If it is desired to operate our apparatus with only the single stack $S_1$, the arm 45 (Figure 4) is pivoted to an inoperative position shown by the dotted line 81, and the strip 34 is accordingly always left in the raised position shown in Figure 2 since the cam wheel 43 is not rotated. Therefore, on the backward movement of the carriage 10, angle beam 31 strikes limit switch 32. This stops the action of cylinder 69 and places the carriage 10 at its most retracted position in which it was originally. The cylinder 26 may then be again actuated either manually or by a circuit such as a time delay circuit established by tripping limit switch 32. Thereafter, the operation as described is repeated.

However, if the apparatus is to be used to remove alternately the topmost sheet from a stack $S_2$ as well as the topmost sheet from stack $S_1$, arm 45 is pivoted against a rest 82 (Figure 4). In this instance, as the cylinder 69 pulls the carriage 10 toward the roller table 78, arm 45 strikes a cam arm 44a of the cam wheel 43 and thereby rotates shaft 42 ninety degrees. Arm 45 is preferably spaced along beam 13 a sufficient distance so that at the most forward position of the carriage 10 there is just sufficient impetus imparted to the cam wheel by arm 45 to effect the ninety degree rotation. In this connection, because of the substantially rectangular cross-section of the roller 39, it is necessary only to force the rounded edges of the roller somewhat past the contact point with the arms 37 and 38 to effect the desired change of roller position. The described spacing of the arm 45 from the cam wheel 43 materially reduces any likelihood of interference between the arm 45 and a succeeding arm on the cam wheel, for example, arm 44b, which might be brought into line with the arm 45 as a result of rotating shaft 42. However, should there be contact between the cam arm 44b and arm 45, it occurs after cam arm 44a has been moved as desired so that the succeeding cam arm 44b merely lifts arm 45 from its rest 82. Upon the return movement of the carriage, any interference between the arms is similarly avoided since arm 45 rises around its pivot point to slide over the arm 44b.

Rotating shaft 42 ninety degrees from its position in Figure 2 brings the longer radius of the roller 39 to bear against the arms 37 and 38. Pushing these arms outwardly lowers strip 34 to a depressed position engageable with limit switch 32. Therefore, in this case, upon the return movement of the carriage 10, strip 34 instead of beam 31 operates switch 32 and at an earlier moment in the backward travel of the carriage. As a result, the vacuum cups 63 are placed over stack $S_2$ which is closer to the roller table. This time, actuation of cylinder 26 causes the cups 63 to grip the topmost sheet of stack $S_2$. When cylinder 69 now pulls carriage 10 to release a sheet over the roller table 78 as before, arm 45 again operates cam wheel 43. This rotation of shaft 42 causes the shorter radius of roller 39 again to bear against the arms 37 and 38 and enables spring 36 to pivot the strip 34 to the inoperative position of Figure 2. Accordingly, on the return movement of the carriage, strip 34 clears limit switch 32 but beam 31 trips it as before. The carriage 10 and vacuum cups 63 are therefore once again stopped in their most retracted position wherein the topmost sheet of stack $S_1$ is transferred. Thereafter, the operation as described is repeated so that the topmost sheets of stacks $S_1$ and $S_2$ are alternately removed and deposited on the roller table 78.

The electrical circuits, including time delay circuits, which operate the air cylinders in response to actuation of the limit switches are well known in the art and therefore not illustrated.

While the foregoing disclosure describes a presently preferred embodiment, it is understood that the invention may be practiced in other forms within the scope of the following claims.

We claim:

1. Apparatus for alternately transferring to a station the topmost article from two stacks disposed at the same side of that station, said apparatus including a carriage, means on the carriage to grip the topmost article of each stack and having one-way engagement with fixed trip means at the station to release the article thereat, means to reciprocate the carriage from the station in the common direction of the stacks, and means responsive to that one direction of movement of the carriage to place the carriage alternately in an engageable position with each stack.

2. Apparatus for alternately transferring to a delivery station the topmost sheet or similar article from two stacks of the same disposed in the same side of that station, said apparatus including a carriage, means on the carriage to grip the topmost article of each stack and having one-way engagement with fixed trip means at the station to release the article thereat, means to reciprocate the carriage from the station in common direction of the stacks, and means responsive to that one direction of movement of the carriage to alternate the length of travel of the carriage away from the station whereby the carriage is alternately placed in an engageable position with each stack.

3. Apparatus for alternately transferring to a delivery station the topmost sheet from two stacks of the same disposed side-by-side in line with the station including a carriage, a lever pivoted on the carriage having means to grip the topmost sheet of each stack, means to pivot the lever and effect said gripping, means to move the carriage forwardly and backwardly between the station and the stack located farther therefrom, and means responsive to the movement of the carriage to stop the carriage during its alternate movements away from the station adjacent the stack nearer thereto whereby the gripping means removes the topmost sheet from alternate stacks.

4. Apparatus for alternately transferring to a delivery station the topmost sheet from two stacks of the same disposed side-by-side in line with the station including a carriage mounted for reciprocation between the delivery station and the stack stationed farther therefrom, a lever pivoted on the carriage, vacuum engaging means adjacent one end of the lever to grip the topmost sheet of each stack, means on the carriage to pivot the lever and effect said gripping, means to reciprocate the carriage, means adapted to stop the carriage during its movement away from the delivery station adjacent each stack, means responsive to the alternate movements of the carriage toward the station to render ineffective the stop means for the stack nearer the station whereby the vacuum engaging means grips the topmost sheet from alternate stacks, and means adjacent the station to release the vacuum engaging means.

5. Apparatus for alternately transferring to a delivery station the topmost sheet from two stacks of the same disposed side-by-side in line with the station including a carriage mounted for reciprocation between the delivery station and the stack stationed farther therefrom, a lever pivoted on the carriage, vacuum cups adjacent one end of the lever to grip the topmost sheet of each stack, means on the carriage to pivot the lever and effect said gripping, means to reciprocate the carriage, a switch adjacent the path of travel of the carriage adapted to stop the carriage reciprocating means, first and second spaced stops on the carriage to engage the switch and stop the carriage adjacent the farther and nearer stacks, respectively, with respect to the delivery station, the second stop being mounted for movement to an inoperative position, cam means actuated by the approaches of the carriage to the station alternately to move the second stop to an operative and inoperative position whereby the vacuum cups grip the topmost sheet from alternate stacks, and means adjacent the delivery station to release the vacuum cups.

6. Apparatus for alternately transferring to a delivery station the topmost sheet from two stacks of the same disposed side-by-side in line with the station including a carriage mounted for reciprocation between the delivery station and the stack stationed farther therefrom, a lever pivoted on the carriage, vacuum cups adjacent one end of the lever to grip the topmost sheet of each stack, means on the carriage to pivot the lever and effect said gripping, means to reciprocate the carriage, a switch adjacent the path of travel of the carriage adapted to stop the carriage reciprocating means, first and second spaced stops on the carriage to engage the switch and stop the carriage adjacent the farther and nearer stacks, respectively, with respect to the delivery station, the second stop being pivoted for movement between operative and inoperative positions, cam means on the carriage adapted to pivot the second stop between said positions, a cam actuator stationed adjacent the path of travel of the carriage responsive to the approach of the carriage to the delivery station to actuate the cam means whereby the second stop is alternately in an operative and inoperative position and the carriage stops adjacent alternate stacks to transfer the topmost sheet thereof to the station, and means adjacent the delivery station to release the vacuum cups and deposit the sheet.

7. Apparatus as claimed in claim 4 wherein the vacuum engaging means includes a vacuum cup having a vent normally closed by a plug and the vacuum releasing means is adapted to lift the plug and thereby open the vent.

8. Apparatus as claimed in claim 4 wherein the vacuum engaging means includes a beam pivoted on the lever having a plurality of depending frames, each frame having a vent opening, a plug normally closing the vent opening, another lever pivoted on each frame and connected to the plug, a rod connecting the levers of each frame, and a vacuum cup secured to each frame at said vent opening, and wherein the vacuum releasing means includes means to lift the rod and thereby lift the plugs and expose the vent openings.

References Cited in the file of this patent

UNITED STATES PATENTS

| | | |
|---|---|---|
| 672,148 | Green | Apr. 16, 1901 |
| 2,716,497 | Wahl et al. | Aug. 30, 1955 |

FOREIGN PATENTS

| | | |
|---|---|---|
| 23,494 | Norway | June 30, 1913 |